United States Patent
Li et al.

(10) Patent No.: US 9,794,946 B2
(45) Date of Patent: Oct. 17, 2017

(54) NETWORK ASSISTED INTERFERENCE MITIGATION

(71) Applicant: Telefonaktiebolaget L M Ericsson (publ), Stockholm (SE)

(72) Inventors: Shaohua Li, Beijing (CN); George Jöngren, Sundbyberg (SE); Fredrik Nordström, Lund (SE); Stefania Sesia, Roquefort les Pins (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/649,582

(22) PCT Filed: Jan. 30, 2015

(86) PCT No.: PCT/SE2015/050105
§ 371 (c)(1),
(2) Date: Jun. 4, 2015

(87) PCT Pub. No.: WO2015/115991
PCT Pub. Date: Aug. 6, 2015

(65) Prior Publication Data
US 2016/0262161 A1    Sep. 8, 2016

Related U.S. Application Data

(60) Provisional application No. 61/934,269, filed on Jan. 31, 2014.

(51) Int. Cl.
*H04W 72/08* (2009.01)
*H04J 11/00* (2006.01)
*H04L 5/00* (2006.01)

(52) U.S. Cl.
CPC ....... *H04W 72/082* (2013.01); *H04J 11/0023* (2013.01); *H04L 5/0051* (2013.01)

(58) Field of Classification Search
CPC .................................................. H04W 72/082
USPC .......................................................... 370/329
See application file for complete search history.

(56) References Cited

FOREIGN PATENT DOCUMENTS

| CN | 103327629 A | 9/2013 |
|---|---|---|
| EP | 2 654 333 A1 | 10/2013 |
| EP | 2 661 002 A1 | 11/2013 |
| EP | 2 830 384 A1 | 1/2015 |

(Continued)

OTHER PUBLICATIONS

PCT Written Opinion of the International Preliminary Examining Authority for International application No. PCT/SE2015/050105, Jan. 5, 2016.

(Continued)

*Primary Examiner* — Ronald B Abelson
(74) *Attorney, Agent, or Firm* — Baker Botts, LLP

(57) ABSTRACT

According to some embodiments, a method performed by a network node (115A) for providing interference mitigation assistance to a wireless device (110C) includes associating demodulation reference signal (DMRS) sequence information with at least one transmission parameter that applies to the DMRS sequence information. An indication of the association of the DRMS sequence information with the at least one transmission parameter is transmitted to the wireless device (110C) for use in performing mitigation of an interfering signal from a first transmission point (115A or 115B).

26 Claims, 5 Drawing Sheets

(56) References Cited

FOREIGN PATENT DOCUMENTS

WO     WO2014107095     *    7/2014   ............... H04B 7/26
WO     WO 2015/069180 A1    5/2015

OTHER PUBLICATIONS

PCT Notification of Transmittal of the International Search Report and the Written Opinion of the International Searching Authority, or the Declaration for International application No. PCT/SE2015/050105, Jun. 3, 2015.

PCT International Preliminary Report on Patentability for International application No. PCT/SE2015/050105—May 6, 2016.

* cited by examiner

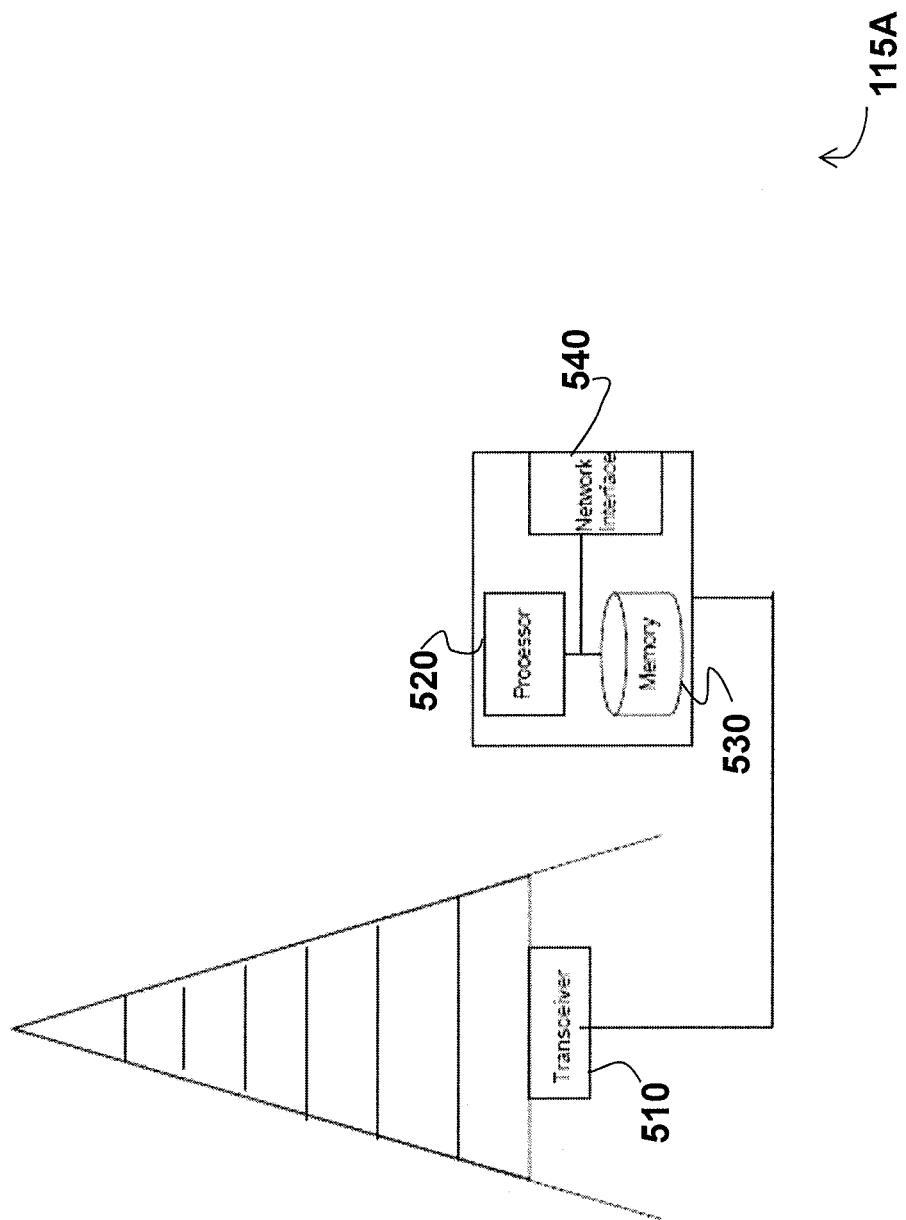

NETWORK ASSISTED INTERFERENCE MITIGATION

PRIORITY

This nonprovisional application is a U.S. National Stage Filing under 35 U.S.C. §371 of International Patent Application Serial No. PCT/SE2015/050105, filed Jan. 30, 2015, and entitled "Network Assisted Interference Mitigation" which claims priority to U.S. Provisional Patent Application No. 61/934,269 filed Jan. 31, 2014, both of which are hereby incorporated by reference in their entirety.

TECHNICAL FIELD

Particular embodiments relate generally to wireless communications and more particularly to network assisted interference mitigation.

BACKGROUND

In a wireless network, a wireless device may communicate with one or more radio network nodes to transmit and receive voice traffic, data traffic, control signals, and so on. Maintaining good signal quality between the wireless device and the radio network node may allow for good performance, such as high bitrate transmissions or robust control channel performance. However, it may be difficult to maintain good signal quality in complex radio environments.

For example, to meet higher capacity demands and to enhance user experience, cellular communications networks are increasing the number of base stations employed. One approach for increasing the density of base station is achieved by splitting macro cells in highly loaded geographical areas into multiple smaller cells. Another approach is to employ a heterogeneous network that includes a mixture of macro cells and small cells with overlapping coverage areas within the cellular network. One example includes a cellular network having clusters of pico cells within the macro coverage area to offload macro traffic. A pico base station provides service to a pico cell. Typically, a pico base station is a low power node (LPN) that transmits with low output power and covers a much smaller geographical area than a high power node, such as a macro base station. Other examples of low power nodes are home base stations and relays.

The densification of the underlying support for the cellular network may allow radio resources to be reused. Additionally, because wireless devices may be closer to the serving base station, wireless devices may achieve higher bitrates. However, though the presence of additional base stations increases system performance and improves user experiences, such networks are not without its disadvantages. For example, interfering cells may create noise that interferes with the signal quality.

To mitigate inter-cell interference, mitigation techniques have been employed on the transmitter side, the receiver side, or on both sides. Interference mitigation on the transmitter side includes those methods that seek to coordinate the physical channel transmissions across cells to avoid severe interference. For example, an aggressor base station may occasionally mute its transmissions on certain radio resources in order for a victim base station to schedule interference sensitive wireless devices on radio resources with reduced interference. On the receiver side, advanced receivers may employ enhanced interference suppression schemes, maximum likelihood techniques, and/or interference cancellation techniques. Application of these advanced interference cancellation techniques to signals originating from other cells requires blind estimation of certain signal format parameters. Currently no signaling is defined in long term evolution (LTE) standard in order to provide wireless devices with the assistance which may be needed in order to implement advanced receivers with limited complexity.

SUMMARY

According to some embodiments, systems and methods are provided that include providing demodulation reference signal (DMRS) information by a network node to a first wireless device for use in performing interference mitigation.

In one example embodiment, a method performed by a network node for providing interference mitigation assistance to a wireless device is provided. The method includes associating demodulation reference signal (DMRS) sequence information with at least one transmission parameter that applies to the DMRS sequence information. An indication of the association of the DRMS sequence information with the at least one transmission parameter is transmitted to the wireless device for use in performing mitigation of an interfering signal from a first transmission point.

In one example embodiment, a method performed by a wireless device for performing interference mitigation is provided. The method includes receiving, from a network node, an indication of an association of demodulation reference signal (DMRS) sequence information with at least one transmission parameter that applies to the DMRS sequence information. An interfering signal transmitted from a first transmission point is identified. One or more DMRS parameters of the interfering signal are detected. Based on the indication of the association of the DMRS sequence information to the at least one transmission parameter, it is identified that the at least one transmission parameter is associated with the detected one or more DMRS parameters of the interfering signal. The at least one transmission parameter is used to perform interference mitigation of the interfering signal.

In one example embodiment, a network node for providing interference mitigation assistance to a wireless device is provided. The network node includes memory containing executable instructions and one or more processors in communication with the memory. The one or more processors are operable to execute the instructions to cause the first network node to associate demodulation reference signal (DMRS) sequence information with at least one transmission parameter that applies to the DMRS sequence information. An indication of the association of the DRMS sequence information with the at least one transmission parameter is transmitted to the wireless device for use in performing mitigation of an interfering signal from a first transmission point.

In one example embodiment, a wireless device for performing interference mitigation is provided. The wireless device includes memory containing executable instructions and one or more processors in communication with the memory. The one or more processors are operable to execute the instructions to cause the wireless device to receive, from the network node, an indication of an association of demodulation reference signal (DMRS) sequence information with at least one transmission parameter that applies to the DMRS sequence information. An interfering signal transmitted from a first transmission point is identified. One or more DMRS parameters of the interfering signal are detected. Based on the indication of the association of the DMRS sequence information to the at least one transmission parameter, it is identified that the at least one transmission parameter is associated with the detected one or more DMRS parameters of the interfering signal. The at least one transmission parameter is used to perform interference mitigation of the interfering signal.

In one example embodiment, a computer program product for providing interference mitigation assistance to a wireless device is provided. The computer program product includes a non-transitory computer readable storage medium having computer readable program code embodied in the medium. The computer readable program code includes computer readable program code to associate demodulation reference signal (DMRS) sequence information with at least one transmission parameter that applies to the DMRS sequence information. The computer readable program code also includes computer readable program code to transmit an indication of the association of the DRMS sequence information with the at least one transmission parameter to the wireless device for use in performing mitigation of an interfering signal from a first transmission point.

In one example embodiment, a computer program product for performing interference mitigation is provided. The computer program product includes a non-transitory computer readable storage medium having computer readable program code embodied in the medium. The computer readable program code includes computer readable program code to receive, from a network node, an indication of an association of demodulation reference signal (DMRS) sequence information with at least one transmission parameter that applies to the DMRS sequence information. The computer readable program code also includes computer readable program to identify an interfering signal transmitted from a first transmission point and detect one or more DMRS parameters of the interfering signal. The computer readable program code also includes computer readable code to identify, based on the indication of the association of the DMRS sequence information to the at least one transmission parameter, that the at least one transmission parameter is associated with the detected one or more DMRS parameters of the interfering signal. The computer readable program code includes computer readable code to use the at least one transmission parameter to perform interference mitigation of the interfering signal.

Some embodiments of the disclosure may provide one or more technical advantages. As an example, in some embodiments, power consumption and processor complexity associated with mitigating interference at a wireless device may be reduced by signaling the quasi-co-located information of an aggressor cell demodulation reference signal (DMRS) and a channel state information reference symbol (CSI-RS) or a cell-specific reference symbol (CRS) from the network node to the wireless device. For example, in a coordinated multipoint transmission (COMP) scenario, a first network node may transmit the physical downlink share channel (PDSCH) to a wireless device and a second network node may transmit the CSI-RS to the wireless device. In this case, the PDSCH and its corresponding DMRS may experience different Doppler effects, gain, or delay from the CSI-RS. Where the CSI-RS is not quasi-co-located with the PDSCH, channel estimations based on the CSI-RS may cause performance degradation. Therefore, signaling to the wireless device which CSI-RS ports it can consider as quasi-co-located to the DMRS ports of the aggressor cell will assist the wireless device to calculate reliable channel estimations and improve interference mitigation performance.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 5 is a block diagram illustrating an exemplary network node, according to certain embodiments.

DETAILED DESCRIPTION

In a wireless network, a wireless device may communicate with one or more radio network nodes to transmit and receive voice traffic, data traffic, control signals, and so on. Maintaining good signal quality between the wireless device and the radio network node may allow for good performance, such as high bitrate transmissions or robust control channel performance. However, it may be difficult to maintain good signal quality in complex radio environments. For example, interfering cells may create noise that interferes with the signal quality. Embodiments of the present disclosure may facilitate mitigating interference associated with an interfering cell. Particular embodiments are described in FIGS. 1-5 of the drawings, like numerals being used for like and corresponding parts of the various drawings.

Figure 1:
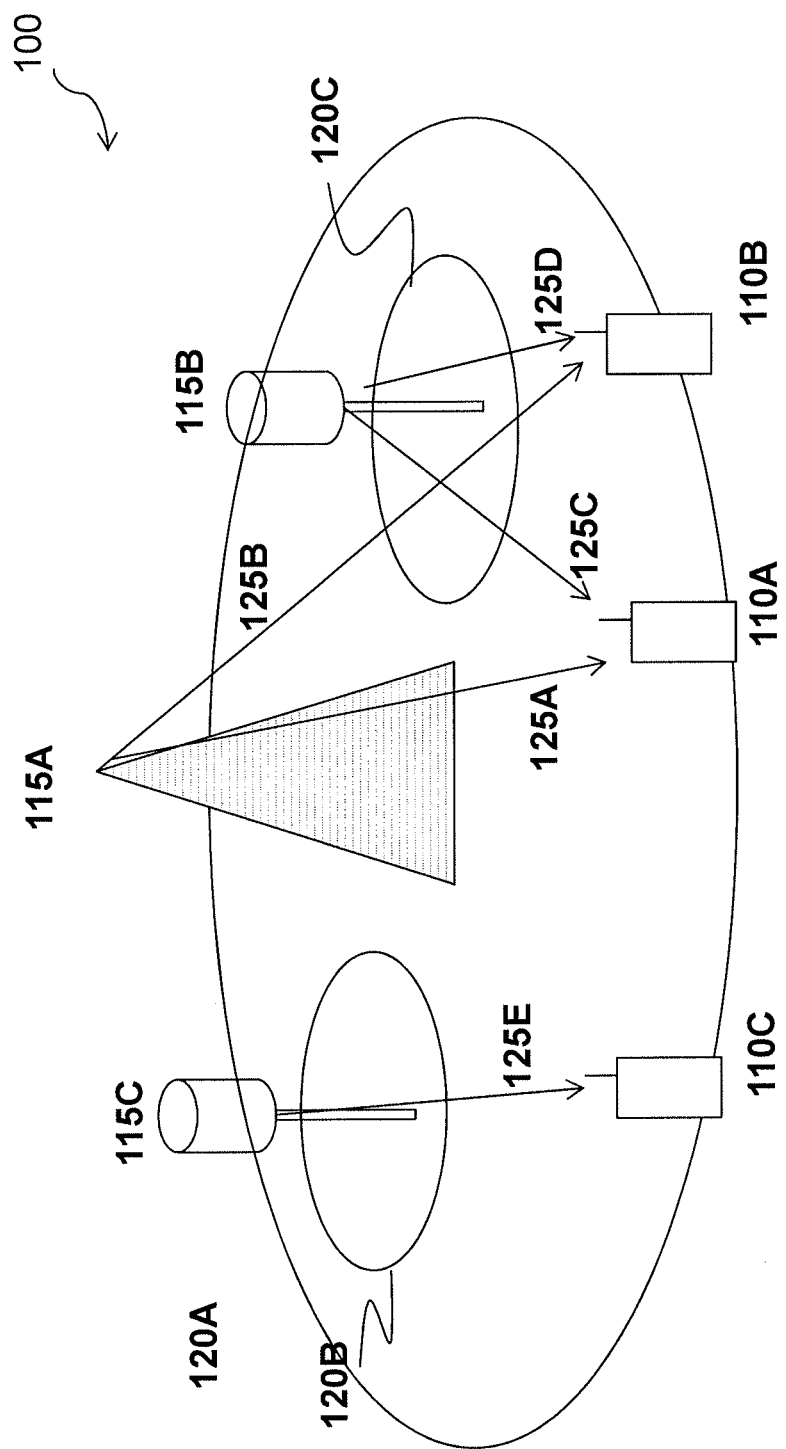
FIG. 1 is a block diagram illustrating an embodiment of a wireless telecommunications network, according to certain embodiments.

FIG. 1 is a block diagram illustrating embodiments of a wireless network 100 that includes wireless devices 110A-C and one or more different types of network nodes 115A-C capable of communicating (directly or indirectly) with wireless devices 110A-C. Each wireless device 110A-C may communicate with and/or receive wireless communications services from a respective one of network nodes 115A-C over a wireless interface. For example, wireless device 110A may transmit wireless signals to and receive wireless signals from radio network node 115A. The wireless signals may contain voice traffic, data traffic, control signals, and/or any other suitable information.

The terms wireless device 110A-C and network node 115A-C, as used herein, are considered general terms and are intended to be considered as non-limiting. For example, "network node" may correspond to any type of radio network node or any network node, which communicates with wireless devices 110A-C and/or another network node 115A-C. Examples of network nodes 115A-C may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, remote radio unit (RRU), remote radio head (RRH), nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115A-C and/or with another wireless device 110A-C in a cellular or mobile communication system. Examples of wireless devices 110A-C include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Each of wireless device 110 and radio network node 115 may include any suitable combination of hardware and/or software. Network nodes 115A-C or other network elements such as a radio network controller or core network node (not shown) may also include any additional elements suitable to support communication between wireless devices 110A-C or between a wireless device 110A-C and another communication device (such as a landline telephone). Examples of particular embodiments of wireless device 110A-C and radio network nodes 115A-C are described with respect to FIGS. 4 and 5 below, respectively.

Wireless devices 110A-C and radio network nodes 115A-C may use any suitable radio access technology, such as long term evolution (LTE), LTE-Advanced, UMTS, HSPA, GSM, cdma2000, WiMax, WiFi, WCDMA, another suitable radio access technology, or any suitable combination of one or more radio access technologies. For purposes of example, various embodiments may be described within the context of certain radio access technologies, such as 3rd Generation Partnership Project (3GPP) LTE technology, which is a mobile broadband wireless communication technology in which transmissions from radio network nodes 115A-C, which may include base stations such as those referred to as eNBs in particular embodiments, to wireless devices, which may also be referred to as UE, are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE). However, it is generally recognized that the disclosure is not limited to 3rd Generation Partnership Project (3GPP) LTE or other provided examples and other embodiments could use different radio access technologies.

In the depicted embodiment, each network node 115A-C has an associated coverage area 120A-C. For example, when wireless device 110A is within coverage area 120A associated with network node 115A, wireless device 110A may communicate with the network node 115A to transmit or receive signal 125A. Network node 115A may be a serving cell or another cell of interest to wireless device 110A, and signal 125A may include voice traffic, data traffic, control signals, or any other suitable information communicated between wireless device 110A and network node 115A.

However, in various embodiments, wireless device 110A may be impacted by one or more interfering signals. For example, in the depicted embodiment, wireless device 110A may be impacted by an interfering signal 125E from an interfering node, such as interfering network node 115C (e.g., an aggressor cell or neighboring cell). Interfering signal 125E may interfere with the ability of wireless device 110A to receive signal 125A clearly. For example, interfering signal 125E may cause performance problems such as lower bitrate transmissions between wireless device 110A and network node 115A. It may be recognized that interfering signal 125E may tend to be stronger or cause greater interference when wireless device 110A is located near interfering network node 115C.

Wireless device 110A may have interference mitigation capabilities that enable wireless device 110A to fully or partially eliminate the interference caused by interfering signal 125E. For example, in certain embodiments, wireless device 110A may use symbol level interference cancellation (SLIC) to regenerate interfering signal 125E after demodulation and subtracts interfering signal 125E from receiving signal 115A. Additionally or alternatively, wireless device 110A may use codeword level interference cancellation (CWIC) to synthesize interference signal 125E after channel decoding and subtracts interfering signal 125E from receiving signal 125A. However, SLIC and CWIC are provided for exemplary purposes. Wireless device 110A may use any one or any combination of appropriate mitigation techniques. For purposes of this disclosure, the term interference mitigation (IM) may be used interchangeably with any of the following similar terms: interference cancellation (IC), interference elimination, interference suppression, interference reduction, interference minimization, and so on.

The complexity of network 100 affects the ability of wireless device 110A to perform interference mitigation. For example, in some embodiments, network nodes 115A-C may be deployed throughout network 100 as a homogenous deployment, heterogeneous deployment, or mixed deployment. A homogeneous deployment may generally describe a deployment made up of the same (or similar) type of radio network nodes and/or similar coverage and cell sizes and inter-site distances. A heterogeneous deployment may generally describe deployments using a variety of types of radio network nodes having different cell sizes, transmit powers, capacities, and inter-site distances. For example, a heterogeneous deployment may include a plurality of low-power nodes placed throughout a macro-cell layout. Deploying low-power nodes throughout a macro-cell layout may extend capacity in certain traffic hotspots, however, the differences in the various nodes (such as differences in transmit power) may tend to increase the complexity of managing interference in the uplink or in the downlink as compared to a homogenous deployment. Mixed deployments may include a mix of homogenous portions and heterogeneous portions.

Coordinated multipoint transmission (CoMP) may also add to the complexity involved in interference mitigation. CoMP transmission and reception refers to a system where the transmission or reception at multiple, geographically separated antenna sites is coordinated in order to improve system performance. An antenna covering a certain geographical area in a certain manner may be referred to as a transmission point (TP). Coordination between TPs can either be distributed, by means of direct communication between the different network nodes, or centralized by means of a central coordinating network node. CoMP may improve the coverage of high data rates, improve the cell-edge throughput, and increase overall system throughput.

CoMP operation targets many different deployments, including coordination between sites and sectors in cellular macro deployments, as well as different configurations of heterogeneous deployments, where for instance a macro node coordinates the transmission with pico nodes within the macro coverage area. Downlink coordination schemes include Dynamic Point Selection (DPS), Dynamic Point Blanking (DPB), and Non-coherent Joint Transmit (NJT).

In DPS, a TP is dynamically selected to serve a wireless device within a group of cooperative candidate TPs so as to improve the wireless devices' downlink throughput or the overall system performance in general. In DPB, the network actively and dynamically mutes one or more wireless devices to reduce the interference seen by wireless devices that are scheduled for downlink transmission in neighboring cells. In NJT, more than one TP transmits the same data blocks to a wireless device simultaneously. The wireless device receives a combined version of signals from more than one signal path from different TPs. The jointly transmitted signal can raise an average ratio between signal and noise plus interference. Consequently, the download transmit quality is improved.

Quasi-co-location of antenna ports may refer to similar channel properties between different antenna ports. Channel estimation based on reference signals (RS) often makes use of assumptions regarding similarity of the channels over which different RS (where each RS typically corresponds to a logical entity called antenna port) is transmitted. Such assumptions of similar channel properties between different antenna ports are referred to as antenna port quasi-co-location assumptions. The overall co-location assumptions a wireless device makes for a certain channel type (e.g., for PDSCH, or for (e)PDCCH) are collected into a co-location wireless device behavior. "Quasi" co-location does not necessarily imply physical co-location of the antenna ports associated to the channels, but can refer to co-location with respect to the listed channel and/or signal properties.

Although the channel from each antenna port to each wireless device receive port is substantially unique, some statistical properties and propagation parameters may be common or similar among different antenna ports, depending on whether the different antenna ports originate from the same transmission point (TP). Such properties include, e.g., the received power level for each port, the delay spread, the Doppler spread, the received timing (i.e., the timing of the first significant channel tap) and the frequency shift.

In particular embodiments, channel estimation algorithms used by wireless devices 110A-C may perform a three step operation. The first step may include estimating some of the statistical properties of the channel. The second step may include generating an estimation filter based on the estimated properties. The third step may include applying the estimation filter to the received signal in order to obtain channel estimates. The filter may be equivalently applied in the time or frequency domain. While some channel estimator embodiments may not explicitly use the three steps method described here, the techniques used may follow the same general principles.

It may be generally recognized that accurate estimation of the filter parameters in the first step leads to improved channel estimation. In principle, wireless device 110A may obtain such filter parameters from observation of the channel over a single subframe and for one reference symbol (RS) port. The wireless device 110A may, however, improve the filter parameters estimation accuracy by combining measurements associated with different antenna ports (i.e., different RS transmissions) sharing similar statistical properties. Furthermore, wireless device 110A may improve the channel estimation accuracy by combining RSs associated to multiple physical resource blocks (PRBs).

According to various embodiments, the ability of wireless device 110A to estimate filter parameters may be improved based on assistance information received from network node 115A. In certain embodiments, for example, network node 115A, may provide timely information about a transmission channel to a wireless device 110A to enable or improve estimation of the interfering signal. Specifically, network node 115A may associate demodulation reference signal (DMRS) sequence information with at least one transmission parameter that applies to the DMRS sequence information. Network node 115A may then provide the association information to wireless device 110A so that wireless device 110A can detect the structure of interfering signal 125E and perform interference mitigation with respect to the interfering signal 125E. For example, wireless device 110A may be able to detect the modulation style/feature (e.g., modulation order) of interfering signal 125E. Additional information regarding the structure of interference signal 125E, including structure consistency and scheduling resource granularity, may also be provided by network node 115A to help wireless device 110A efficiently estimate and synthesize interfering signal 125E. Providing the information to wireless device 110A reduces the amount of blind estimation required by wireless device 110A and, thus, allows the complexity of wireless device 110A to be reduced. As a result, wireless device 110A may be less costly to produce.

In certain embodiments, wireless device 110A-C may receive association information that enhances the ability of wireless device 110A-C in performing PDSCH and physical downlink control channel (PDCCH) or enhanced PDCCH (ePDCCH) interference cancellation. For example, where network 100 uses CoMP, one network node may transmit PDSCH and another network node may transmit the associated channel state information reference symbol (CSI-RS) or a cell-specific reference symbol (CRS). For example, when using CoMP with the DPS downlink coordination scheme, network node 115A may transmit the PDSCH to wireless device 110A on transmit signal 125A. Network node 115B may transmit the associated CSI-RS to wireless device 110A on transmit signal 125D. In this case, the PDSCH and its corresponding DMRS may experience different delay spread, Doppler spread, Doppler shift, average gain and average delay from CSI-RS or CRS. However, in the case where the CSI-RS or the CRS are not quasi-co-located with the PDSCH, employing CSI-RS or CRS for the estimation of channel statistics may lead to performance degradation.

In certain embodiments, the indication of the association of the DRMS sequence information with the at least one transmission parameter received by wireless device 110A-C may identify a plurality of ports that are quasi-co-located to each other. Providing quasi-co-location information from network node 115A to wireless device 110A may assist the wireless device 115A in determining reliable channel statistics. For example, network node 115A may be aware of which RS ports are associated with channels with similar properties, based on the knowledge of network node 115A of how antenna ports are mapped to physical points. Wireless device 110A, however, may not be aware a-priori of such information because of the transparency principle of network transmission. To make the wireless device 110A aware, a particular embodiment may use transmission mode 10 in LTE Rel-11, which supports dynamic signaling of quasi-co-location information using a DCI format transmitted on a downlink control channel (like PDCCH or ePDCCH). For example, DCI format 2D used in transmission mode 10 may be used for signaling that DMRS for PDSCH is co-located with a specific CSI-RS resource and a specific CRS. A message state in the DCI format gives an index into a configurable table of CSI-RS resources used for defining the meaning of the message state.

In certain embodiments, the same message state may also be used to signal information on how to map the PDSCH onto the resource element grid, including on what orthogonal frequency division multiplexing (OFDM) symbol to start the PDSCH, which reference elements (REs) corresponding to a CRS to map around, what multimedia broadcast multicast service single frequency network (MBSFN) configuration to assume, and what ZP CSI-RS configuration to assume. The radio resource control (RRC) configuration table defining the meaning of each associated message is popularly referred to as the PDSCH mapping and quasi-location information (PQI) table. Correspondingly, the message state itself may be referred to as a PQI indicator. The information is defined in 3GPP TS 36.331 as follows:

The parameter $n_{ID}^{(i)}$, for transmission mode 8 and 9, is always equal to the cell-id, $N_{ID}^{cell}$. The same cell-id value is used in many places in the LTE specifications and may define a logical cell. For transmission mode 10, configurability with respect to $n_{ID}^{(i)}$ was introduced and $n_{ID}^{(i)} = n_{ID}^{DMRS,i}$, where there are two parameters $n_{ID}^{DMRS,i}$, i=0,1 configured by higher layers. Because $n_{ID}^{DMRS,i}$ plays a similar role as cell-id $n_{ID}^{cell}$ in the formula, it may be referred to as a configurable cell-id (CCID). The parameter $n_{SCID}$, for transmission mode 10, is used to select between one of the two CCIDs (in addition to affecting the least significant bit of $c_{init}$). For this reason, $n_{SCID}$ may be referred to as a CCID selector. Because the parameter $n_{ID}^{(i)}$ is equal to the selected CCID, it is also configurable. Therefore, $n_{ID}^{(i)}$ is may also be referred to as a CCID. Henceforth, the term CCID can thus refer to $n_{ID}^{DMRS,i}$ and/or $n_{ID}^{(i)}$ and/or scrambling identity and/or virtual DMRS cell-id. If there is a need for distinction, the parameter $n_{ID}^{(i)}$ will be referred to as selected CCID. The terms CCID, CCID selector and

```
PDSCH-RE-MappingQCL-Config-r11 ::=     SEQUENCE {
    pdsch-RE-MappingQCL-ConfigId-r11      PDSCH-RE-MappingQCL-ConfigId-r11,
    optionalSetOfFields-r11               SEQUENCE {
        crs-PortsCount-r11                    ENUMERATED {n1, n2, n4, spare1},
        crs-FreqShift-r11                     INTEGER (0..5),
        mbsfn-SubframeConfigList-r11          CHOICE {
            release                               NULL,
            setup                                 SEQUENCE {
                subframeConfigList                    MBSFN-SubframeConfigList
            }
        }                                                         OPTIONAL--Need ON
        pdsch-Start-r11                       ENUMERATED {reserved, n1, n2, n3, n4, assigned}
    }                                                             OPTIONAL,-- Need OP
    csi-RS-ConfigZPId-r11                 CSI-RS-ConfigZPId-r11,
    qcl-CSI-RS-ConfigNZPId-r11            CSI-RS-ConfigNZPId-r11  OPTIONAL,-- Need OR
    ...
}
```

Thus, in certain embodiments, the at least one transmission parameter that is associated with the DRMS sequence may include CRS information that includes any one or a combination of a CRS scrambling identity, a CRS antenna port count, a MBSFN subframe configuration, or another cell specific transmission parameter. Additionally or alternatively, the at least one transmission parameter may include a CSI-RS scrambling identity, a CSI-RS resource configuration identity, a CSI-RS resource configuration, a CSI-RS antenna ports count, a CSI-RS subframe configuration, and/or a CSI-RS scrambling identity.

In certain embodiments where data transmission is based on LTE transmission modes 8, 9 and 10, network node 115A may use DMRS as a pilot/reference signal. DMRS is based on a pseudo-random sequence generated by a pseudo-random sequence generator that is initialized with the following function at the start of each subframe:

$$c_{init} = (\lfloor n_s/2 \rfloor + 1) \cdot (2n_{ID}^{(nSCID)} + 1) \cdot 2^{16} + n_{SCID}$$

The quantities $n_{ID}^{(i)}$, i=0,1 given by $n_{ID}^{(i)} = n_{ID}^{cell}$ if a value for $n_{ID}^{DMRS,i}$ is not provided by higher layers or if downlink control DCI format 1A, 2B or 2C is used for the DCI associated with the PDSCH transmission, otherwise $n_{ID}^{(i)} = n_{ID}^{DMRS,i}$ may be used.

DMRS sequences depend on slot number $n_s$ and the parameters $n_{ID}^{(i)}$ and node scrambling identity, $n_{SCID}$. The value of $n_{SCID}$ used for a PDSCH can be signaled to the wireless device receiving the PDSCH by downlink control information for each subframe.

selected CCID all have a direct mapping to the mentioned parameters, but they can also be interpreted more broadly according to their indicative naming.

The wireless device may obtain $n_{ID}^{cell}$ by detecting and estimating the primary synchronization signal (PSS)/secondary synchronization signal (SSS) and CRS of other cells. In various embodiments, the value $n_{ID}^{DMRS,i}$ may be one of 504 possible values. The slot number may be estimated from timing information of the other cells, e.g. using PSS/SSS or CRS.

Figure 2:
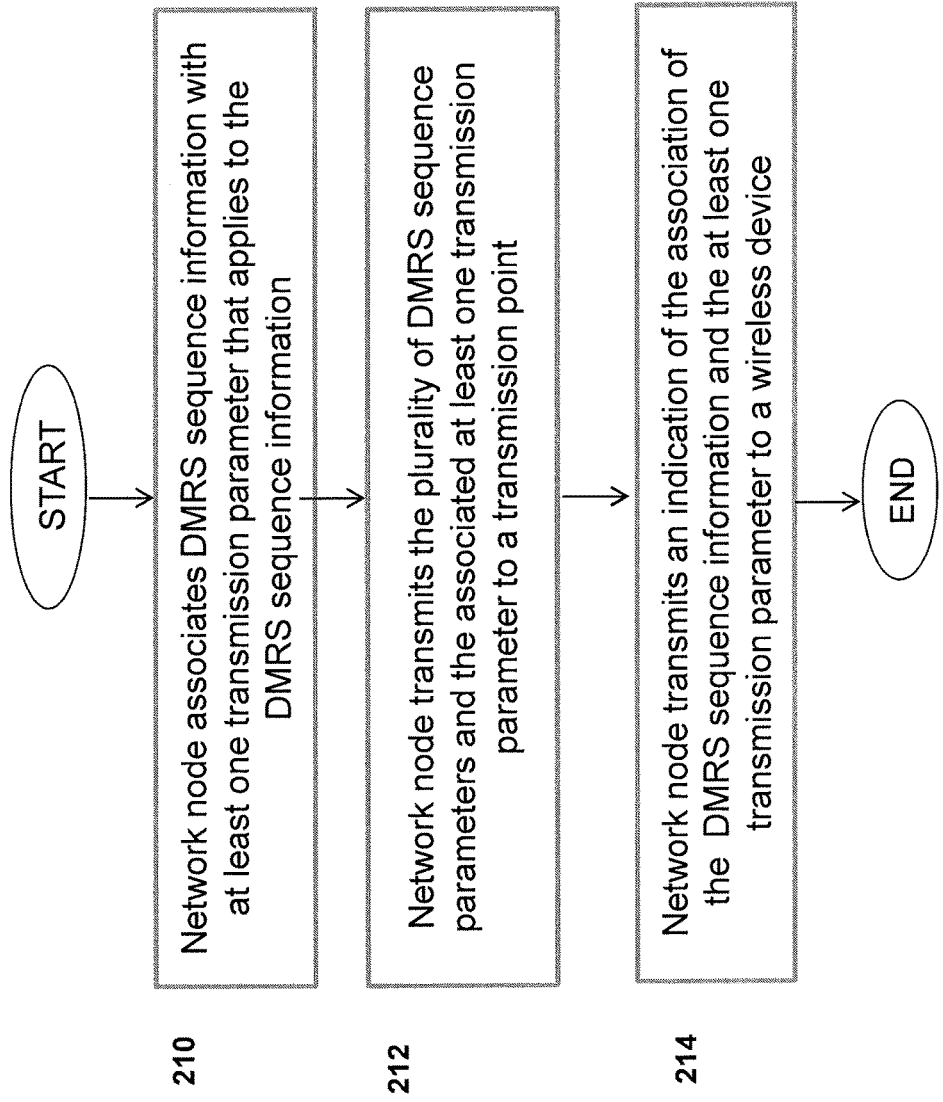
FIG. 2 is a flow diagram illustrating a method performed by a network node for providing interference mitigation assistance to a wireless device, according to certain embodiments.

FIG. 2 is a flow diagram illustrating a method performed by a network node 115A for providing interference mitigation assistance to wireless device 110A, according to certain embodiments. As formerly discussed with regard to FIG. 1, network node 115A may have one or more neighboring network nodes such as network node 115B and 115C from which wireless device 110A may receive signals. For example, any one of communications signals 125B-E between network nodes 115A-C and wireless devices 110B-C may interfere with communication signal 125 between network node 115A and wireless device 110A. In some embodiments, network node 115A may enable wireless device 110A to cancel neighbor cell PDSCH/(e)PDCCH, such as PDSCH/(E)PDCCH interference generated by network nodes 115B-C. Thus, network node 115A may associate DMRS sequence parameters (e.g, the DMRS scrambling identity, DMRS ports, etc.) with PQI state of the neighbor cell interfering transmission and/or other transmission parameters. Network node 115A may then send the associated information as assistance information to the interference cancellation capable wireless device 110A for interference mitigation. In particular, network node 115A indicates which CRS and/or CSI-RS ports may be considered quasi-co-located to the DMRS ports of the aggressor cell using the transmitted DMRS sequence and the associated transmission parameters. Network node 115A may also use the transmitted DMRS sequence and the associated transmission parameters to indicate the physical channel mapping (e.g., PDSCH, (e)PDCCH, PHICH, PCFICH, PBCH, PSS/SSS, etc) and other transmission parameters (e.g., modulation order information, transmission mode, coding rate information, etc.) for the neighbor cell interfering transmission.

The method begins at step 210, where network node 115A associates a plurality of DMRS sequence parameters with one or more transmission parameters. In some embodiments, the transmission parameters may include one or more of the CRS scrambling identity which are quasi-co-located, the CSI-RS scrambling identity which are quasi-co-located, or a CSI-RS resource configuration. The CSI-RS resource configuration may include CSI-RS resource configuration identity, antenna ports count, resource configuration, subframe configuration, and CSI-RS scrambling identity. The CSI-RS resource configuration may further include quasi-co-located CRS scrambling identity, CRS antenna ports count, MBSFN subframe configuration and other CRS related configuration. In some embodiments, the transmission parameters may include CRS-assistant information. The CRS-assistant information may include CRS scrambling identity, CRS antenna ports count, MBSFN subframe configuration and other CRS related configuration information.

In some embodiments, the transmission parameters may include PDSCH mapping and PQI. For example, one set of DMRS sequence parameters may be associated with one set of PQI information, and another set of DMRS sequence parameters may be associated with another set of PQI information. The PQI information may include one or more of the number of CRS ports, frequency shift of CRS, MBSFN subframe configuration information, the start symbol of PDSCH, Zero-power CSI RS configuration, and Non-zero power CSI-RS configuration. In some embodiments, the transmission parameters may include other transmitted parameters for aggressor cell transmission, such as one or more of Control Format Indicator (CFI); Cell ID; Transmission Mode (TM); System bandwidth; nSCID; MBSFN configuration; Modulation Order; Precoding Matrix Indicator (PMI); PDSCH allocation; CSI-RS presence and their pattern; Rank Indicator (RI); Modulation Coding Scheme (MCS); Data to RS EPRE, PA; PDSCH bandwidth for DM-RS; Virtual cell ID; CRS antenna ports (CRS AP); Radio Network Temporary Identifier (RNTI); Data to PS EPRE, PB; and DMRS APs.

In certain embodiments, the associations may have different DMRS sets for each association. For example, when the aggressor interference to wireless device 110A comes from one of transmission signals 115B-D to wireless devices 110B-C, wireless device 110A may attempt to cancel the aggressor interference and continue retrieving data from network node 115A. For wireless device 110A, two DMRS scrambling identity, $n_{ID}^{DMRS,0}(110A)$ and $n_{ID}^{DMRS,1}(110A)$, are configured. In contrast, for wireless device 110B, two DMRS scrambling identity, $n_{ID}^{DMRS,0}(110B)$ and $n_{ID}^{DMRS,1}(110B)$, are configured. For network nodes 115A and 115B, $n_{ID}(115A)$ and $n_{ID}(115B)$ are configured, respectively. $n_{ID}$ can be CRS scrambling identity, CSI-RS scrambling identity, the identification for the CSI-RS resource configuration, the identification for the CRS assistant information, or the set of other parameters for interfering transmission. In network node 115C, the association of aggressor cell DMRS with CRS, CSI-RS, and/or other transmission parameters can be:

$\{n_{ID}(115A), n_{ID}^{DMRS,0}(110A), n_{ID}^{DMRS,1}(110A)\}$
$\{n_{ID}(115B), n_{ID}^{DMRS,0}(110B), n_{ID}^{DMRS,1}(110B)\}$

For wireless device 110A, only network node 115A may be selected as the transmission point, as shown in DPB. $n_{ID}^{DMRS,0}(110A)$ or $n_{ID}^{DMRS,1}(110A)$ may be configured as scrambling identity for the transmission of wireless device 110A. Similar configuration may be applied to wireless device 115B.

For simplicity, only three wireless devices 110A-C are illustrated. However, any number of wireless devices may be present in network 100 and generate interfering signals with respect to one another. In general, the above association is:

$\{n_{ID}(115A), n_{ID}^{DMRS,0}(110A), n_{ID}^{DMRS,1}(110A), \ldots, n_{ID}^{DMRS,0}(k), n_{ID}^{DMRS,1}(k) \ldots \}$
$\{n_{ID}(115B), n_{ID}^{DMRS,0}(110B), n_{ID}^{DMRS,1}(110B), \ldots, n_{ID}^{DMRS,0}(k), n_{ID}^{DMRS,1}(k), \ldots \}$ where $n_{ID}^{DMRS,0}(k)$ and $n_{ID}^{DMRS,1}(k)$ are the first and second scrambling identity configured for the kth wireless device. In some embodiments, the association may not include all the scrambling identities. For some wireless devices, the association may include the first or the second scrambling identity or both.

In particular embodiments, the above examples may be combined. For example, for wireless devices working in DPB mode, and for other wireless devices working in DPS mode, the above association is:

$\{n_{ID}(115A), n_{ID}^{DMRS,0}(m), \ldots, n_{ID}^{DMRS,0}(k), n_{ID}^{DMRS,1}(k) \ldots \}$
$\{n_{ID}(115B), n_{ID}^{DMRS,1}(m), \ldots, n_{ID}^{DMRS,0}(k+1), n_{ID}^{DMRS,1}(k+1) \ldots \}$ where the mth wireless device uses DPS mode, and the kth and (k+1)th wireless device uses DPB mode. In the above examples, any suitable number or type of transmission parameters may be added to the association.

In a particular embodiment, a plurality of associations may be defined by network node 115A. Each association may have the same DMRS set, but different CRS, CSI-RS, PQI, or other parameters related to the aggressor cell's physical channel detection. For example, network node 115A may make possible associations of aggressor cell DMRS with CRS, CSI-RS, and/or other transmitted parameters as follows:

Possible association 1: $\{n_{ID}(115A), n_{ID}^{DMRS,0}(110A), QPSK\}$
Possible association 2: $\{n_{ID}(115A), n_{ID}^{DMRS,1}(110A), 16QAM\}$
Possible association 3: $\{n_{ID}(115B), n_{ID}^{DMRS,0}(110B), QPSK\}$
Possible association 4: $\{n_{ID}(115B), n_{ID}^{DMRS,1}(110B), 16QAM\}$ Where network node 115A is the transmission point for wireless device 110A and QPSK is used for interfering transmission, association 1 may be used. However, where network node 115A is the transmission point for wireless device 110A but 16QAM is used for interfering transmission, association 2 may be used. Similar selection is performed for the pairing of network node 115B and wireless device 110B.

At step 212, network node 115A transmits the plurality of DMRS sequence parameters and the associated at least one transmission parameter to a transmission point, such as network node 115C. For example, in certain embodiments, network node 115A may send the DMRS sequence parameters and the associated at least one transmission parameter to network node 115C. In certain embodiments, one association may correspond to a first transmission point, and a second association may correspond to a second transmission point. Thus, network node 115A may send a second set of DMRS sequence parameters and the associated at least one transmission parameter to network node 115C. In still other embodiments, network nodes 115B and 115C may provide the associations to networks node 115A rather than network node 115A providing the associations to networks nodes 115B and 115C.

At step 214, network node 115A transmits an indication of the association of the DMRS sequence information and the associated at least one transmission parameter to a wireless to wireless device 110A. In some embodiments, the transmitting may be static, semi-static, or dynamic. In some embodiments, the transmission may explicitly indicate the association used for the neighbor cell instantaneous interfering transmission. The indicated association is a subset of the signaled associations. As will be described in more detail below with regard to FIG. 3, wireless device 110A may use the explicit indication to decide the instantaneous PQI state or other parameters related to an aggressor cell's transmission.

For example, in network node 115C, the possible associations of aggressor cell DMRS with CRS, CSI-RS, and/or other transmission parameters may be:

Possible association 1: $\{n_{ID}(115CA), n_{ID}^{DMRS,0}(110A), n_{ID}^{DMRS,1}(110A), n_{ID}^{DMRS,0}(110B), n_{ID}^{DMRS,1}(110B)\}$ Possible association 2: $\{n_{ID}(115B), n_{ID}^{DMRS,0}(110A), n_{ID}^{DMRS,1}(110A), n_{ID}^{DMRS,0}(110B), n_{ID}^{DMRS,1}(110B)\}$ Where network node 115A is the transmission point for wireless devices 110A or 110B, association 1 may be used. Where network node 115B is the transmission point for wireless devices 110A or 110B, association 2 may be used. In this example, both associations are semi-statically signalled from network node 115C to wireless device 110A. For the given subframe, dynamic signalling will be provided from network node 115C to wireless device 110C to inform wireless device 110C which association is the instantaneous association. It can be extended to more possible associations and more wireless devices and network nodes. In the above example, more transmission parameters may be added in the association as required.

As another example, where two DMRS scrambling parameters are configured for the same wireless device, one DMRS scrambling identity may be associated with one CRS scrambling identity, CSI-RS scrambling identity, CSI-RS resource configuration, or CRS-assistant information; and the other DMRS scrambling identity may be associated with a different set of CRS scrambling identity, CSI-RS scrambling identity, CSI-RS resource configuration or CRS-assistant information. Each wireless device may be configured with two DMRS scrambling parameters as $n_{ID}^{DMRS,i}(i=0,1)$, i is indicated by $n_{SCID}$. The value of $n_{SCID}$ used for the PDSCH is signaled to the wireless device receiving the PDSCH by downlink control information for each subframe. In this embodiment, $n_{SCID}$ may be used to indicate which transmission point is used for actual transmission in DPS, especially when the transmission is as the interfering transmission. For example, in network node 115C, the association of aggressor cell DMRS with CRS, CSI-RS, and/or other transmission parameters can be:

$\{n_{ID}(115A), n_{ID}^{DMRS,0}(115A)\}$
$\{n_{ID}(115B), n_{ID}^{DMRS,1}(115A)\}$

For wireless device 110A, when network node 115A is the transmission point, $n_{ID}^{DMRS,0}(110A)$ may be configured as scrambling identity for wireless device 110A transmissions. Otherwise, when network node 115B is the transmission point, $n_{ID}^{DMRS,1}(110A)$ may be configured as scrambling identity for the wireless device 110A transmissions. Similar configuration may be applied to wireless device 110B. In this configuration, for wireless devices 110A and 110B, dynamic point selection scheme may be supported when NAIC is enabled for wireless device 110C.

Using traditional DPS setup, this special configuration may not be necessary. In other words, a different transmission point can configure the same virtual DMRS IDs, and QCL information is used to indicate the transmission point information for the served wireless device. However, for the interfered wireless device, e.g., wireless device 110C, the QCL information of wireless device 110C may be not available. Based on this special association, where virtual DMRS IDs are associated with the transmission point, an interfered wireless device can get interfering transmission point information by detecting virtual DMRS IDs. After wireless device 110C detects the virtual DMRS IDs used for the PDSCH transmission to wireless device 110A, wireless device 110C can further determine the QCL or other parameters used for the PDSCH transmission wireless device 110A based on the signaled association. As a result, wireless device 110C can suppress the interference caused by the PDSCH transmission to wireless device 110A. For wireless device 110A, no new signaling is needed. Thus, legacy wireless devices can support this embodiment. For wireless device 110C, no extra explicit signaling is needed to inform interfering transmission point information. The interfering transmission point information is implicitly included by the association and can be decided via virtual DMRS IDs detection.

When there are more wireless devices in the system, the above association is:

$\{n_{ID}(115A), n_{ID}^{DMRS,0}(110A), n_{ID}^{DMRS,0}(110B), \ldots, n_{ID}^{DMRS,0}(k), \ldots\}$
$\{n_{ID}(115B), n_{ID}^{DMRS,1}(110A), n_{ID}^{DMRS,1}(110B), \ldots, n_{ID}^{DMRS,1}(k), \ldots\}$ where $n_{ID}^{DMRS,0}(k)$ and $n_{ID}^{DMRS,1}(k)$ are the first and second scrambling identity configured for the kth UE.

In particular embodiments, network nodes 115B or 115C signal these associations to network node 115C. Network node 115C sends this association to wireless node 110C. In the above example, additional transmission parameters may be added in the association as required. The above embodiment enables DPS schemes for legacy wireless devices when additional transmission point information cannot be obtained.

As another example embodiment, for each of the four PQI states exists the possibility of sending corresponding DMRS sequence information (which may comprise the parameters determining the sequence initiation) that is used for the PDSCH transmission (to the wireless device of interest) associated with the PQI signalling. The DMRS sequence information may, for example, comprise the virtual DMRS cell-id. Because the downlink control channel allows dynamic selection between two different virtual DMRS cell-ids using the nSCID bit, each state may comprise multiple virtual DMRS cell-id parameters. For simplicity, the embodiment is described in terms of a single virtual DMRS cell-id per state. One of ordinary skill in the art would understand that multiple such cell-ids may be present per state as well as additional DMRS sequence information.

The network may configure the message for each PQI state so that transmission point specific virtual DMRS cell-id is used for PDSCH transmission. Consequently, a PDSCH transmission can dynamically move among a set of points according to DPS while always using a virtual DMRS cell-id common for all PDSCH transmissions for wireless devices supporting such enhanced PQI table configuration coming from a certain point. Thus, all such transmissions from the same point use the same virtual DMRS cell-id regardless of which wireless device the PDSCH transmission targets.

Each transmission point transmits some "static" signal to identify it (e.g., CRS and/or CSI-RS) which can be used for inferring quasi-co-location properties. The network signals (in some cases, semi-statically) an association between a point specific static signal "cell-id" and a candidate virtual DMRS cell-id (which is also point specific) for the wireless device of interest. Several such associations may be signalled, one for each candidate virtual DMRS cell-id.

The association signalling may be a new separate (preferably semi-static) signalling message or be part of the PQI table itself. If the association signalling is part of the PQI table, it may consume extra PQI states and may also create a need to distinguish in the PQI table between CRS/CSI-RS intended for the PDSCH of interest and the CRS/CSI-RS belonging to the interfering PDSCH.

The wireless device may know neighbouring CRS and the CSI-RS configurations it is configured with, and it has received an (semi-static) association between a CRS cell-id and/or virtual CSI-RS cell-id and a virtual DMRS cell-id. The wireless device measurements on CRS and/or CSI-RS therefore reveal candidate virtual DMRS cell-ids of the interfering PDSCH. Conversely, if the wireless device first searches within a set of virtual DMRS cell-id candidates, once it finds a strong DMRS, the wireless device may immediately know which CRS and/or CSI-RS that DMRS is QCL with and with respect to what properties.

This example may also apply to ePDSCH transmissions instead of PDSCH transmissions. Furthermore, synchronization signals such as PSS/SSS may play a similar role here as CRS. This approach of extending the PQI table with the virtual DMRS cell-id to use for PDSCH transmission and semi-statically signalling an association between virtual DMRS cell-id and CRS/CSI-RS cell-id preserves the size of the PQI table thereby avoiding extra dynamic signalling overhead.

The previous example may also support the DPS case for shared cells, in certain embodiments. In the shared cell case, a set of DMRS virtual cell-ids may be associated to the same CRS cell-id while each individual virtual DMRS cell-id is associated to a virtual CSI-RS cell-id. Support for JT is handled by associating multiple CRS cell-ids and/or multiple virtual CSI-RS cell-ids to a virtual DMRS cell-id. Some embodiments may use a virtual DMRS cell id specific to the set of points involved in the transmission.

This approach handles other settings beyond virtual DMRS cell-id as long as the settings are fixed for each transmission point, including PDSCH mapping (starting OFDM symbol, CRS RE to map around, NZP/ZP CSI-RS to map around, MBSFN subframe). This may be handled by associating those settings to a static point specific signal in a similar manner as exemplified for virtual DMRS cell-id. When the settings are dynamically varying, which may be the case for starting OFDM symbol, the wireless device may read PCFICH of the associated CRS cell-id to find out the control region size used for the interfering PDSCH transmissions. Control region size is the only one of the PDSCH mapping settings that can change dynamically in an unpredictable manner.

In still other embodiments, the starting OFDM symbol for the PDSCH mapping may alternatively be determined based on the serving cell's starting OFDM symbol. This is advantageous in a shared cell scenario where a set of transmission points have the same control region.

When reading the PCFICH of neighbouring cells is not feasible, then adding information about interfering signals for each PQI state is an alternative. Such interferer information may comprise interfering virtual DMRS cell-id and associated starting OFDM symbol. CRS/CSI-RS info concerning interfering signals may be associated with virtual DMRS cell ids outside the PQI table or inside the PQI table by adding more information to each state. If the control regions vary dynamically between 1 to 3 OFDM symbols, each interfering virtual DMRS cell-id candidate will consume 3 PQI states, implying six states when the wireless device only needs to semi-statically track the two strongest interfering points.

In the example embodiments described above, the transmission explicitly indicates the association. However, in other embodiments, the transmission of the indication of the association of DMRS sequence to transmission parameters may implicitly indicate the association used for the neighbor cell instantaneous interfering transmission based on the DMRS sequence parameters instantaneously used by neighbor cell. The DMRS sequence parameters implicitly carry the configuration information of neighbor cell interfering transmission. For example, two sets of associations for the neighbor cells interfering transmission are signaled. One set associates a first set of DMRS scrambling identities, and a second set associates a second set of DMRS scrambling identities. The DMRS sets are different from these two association sets. If the neighbor cell network node uses the parameters defined in the first association set, the first DMRS set will be used, otherwise, the second DMRS set will be used. The wireless device determines which set of parameters has been used based on the detected DMRS scrambling identities. An example was described above at step 212, where in addition to the quasi-co-located CRS, the modulation order is also included in the association. Additional suitable parameters may be included in the association as required.

In certain embodiments, the indication of the association described at step 210 may further include information concerning how CRS, CSI-RS colocation state, PQI state for interfering signals, and other transmitted parameters may change or evolve over time or frequency. The following examples are described in terms of time, but one of skill in the art will recognize that the concepts apply to frequency, or combinations of time and frequency. In some embodiments, network node 115C may signal to wireless device 110C that the signaled associations will not change, that the signaled associations will not change until further notice, or that the signaled associations will not change after a certain time. Signaling a wireless device that an association will not change allows the network to use less overhead for the association information. In some embodiments, network node 115C may signal to wireless device 110C the size of the candidate association set, including the maximum and minimum size of the association set. In some embodiments, network node 115C may signal to wireless device 110C that the signaled associations are valid for a set of subframes. The set of subframes (subframe pattern) may be specified with a bitmap, as a period, or relative to a reference subframe and the reference subframe could change over time, including where the set of subframes involve the next M subframes into the future. This time coherent signaling may be combined with any of the other exemplary embodiments in this disclosure.

Figure 3:
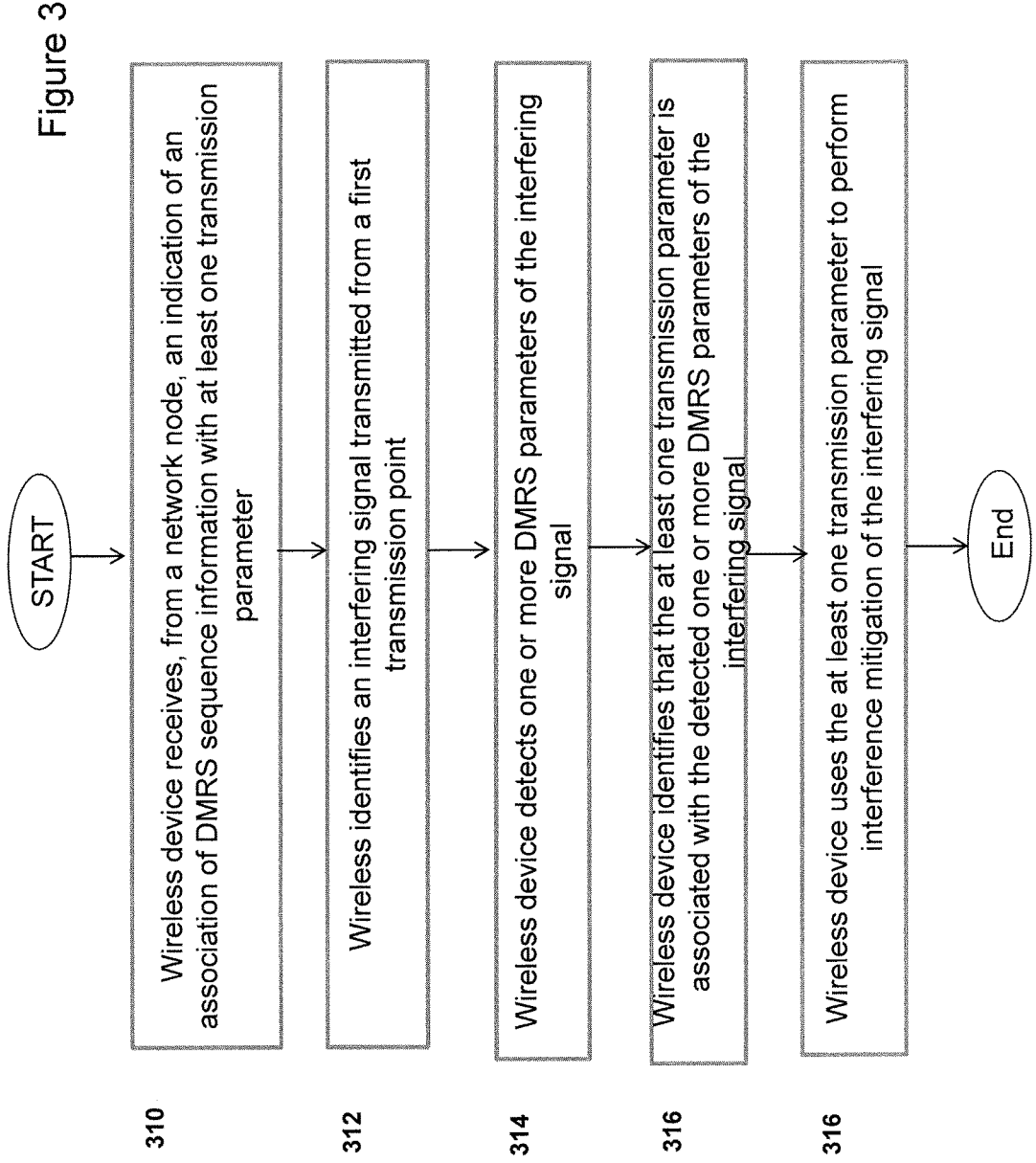
FIG. 3 is a flow diagram illustrating a method performed by a wireless device receiving interference mitigation assistance from a network node, according to certain embodiments.

FIG. 3 is a flow diagram illustrating an exemplary method performed by a wireless 110C device receiving interference mitigation assistance from a network node, according to certain embodiments. Specifically, wireless device 110C receives the indication of association information from network node 115C, as described above with regard to FIG. 2. Wireless device 110C uses the determined information to improve interference mitigation performance of an interfering transmission from a neighboring transmission point.

The method begins at step 310, where wireless device 110C receives an indication of association information of DMRS sequence information with at least one transmission parameter. In a particular embodiment, the indication of the association information may be received from network node 115C and is associated with an aggressor transmission point, such as network node 115A or network node 115B. In certain embodiments, the association information received by wireless device 110C may include partial or full DMRS sequence parameters (e.g., DMRS port information) associated with the aggressor transmission point.

In certain embodiments, the association information received may include information concerning how CRS, CSI-RS colocation state, PQI state for interfering signals, and other transmitted parameters may change or evolve over time or frequency. In certain embodiments, receiving the association information comprises receiving a plurality of associations for the neighbor cell interfering transmission and an explicit indication of the association used for the neighbor cell instantaneous interfering transmission.

At step 314, wireless device 110C detects partial or full DMRS port information associated with an interfering signal. In some embodiments, wireless device 210 may blindly acquire the partial or full DMRS port information used for aggressor signal transmission. In some embodiments, the partial or full DMRS port information used for aggressor signal transmission may be predefined in a specification. In some embodiments, the obtained partial DMRS port information may be a DMRS scrambling identity or a number of DMRS ports.

At step 316, wireless device 110C identifies at least one transmission parameter that is associated with the detected one or more DMRS parameters of the interfering signal. For example, wireless device 110C determine if the detected DMRS port information matches DMRS sequence information stored in response to the indication of association information received at step 310. If wireless device 110C identifies a match between the DMRS port information of an interfering signal and the DMRS sequence information identified in the indication of the association, wireless device 110C may infer the one or more transmission parameters applicable to the interfering signal. As such, based on the received indication of association information and determined DRRS ports information, wireless device 110C may further determine the quasi-co-located CRS or CSI-RS associated with aggressor cell DMRS ports, in particular embodiments. Additionally or alternatively, wireless device 110C may determine the PQI which are used for neighbor cell PDSCH mapping and quasi-co-location based on the received association information and DMRS information. For example, wireless device 110C may determine physical channel mapping for interfering signal transmissions from neighboring transmission points. Specifically, for example, wireless device 110C may determine physical downlink share channel (PDSCH), enhance PDSCH (ePDCCH), physical hybrid-ARQ Indicator Channel (PHICH), physical control format indicator channel (PCFICH), physical broadcast channel (PBCH), PSS/SSS for neighbor cell interfering transmission. Additionally or alternatively, wireless device 110C may determine other transmission parameters, such as MCS, transmission mode, etc., for neighbor cell interfering signal. The association and transmission parameters may include any of the combinations described above with respect to FIG. 2.

At step 318, wireless device 110C uses the at least one transmission parameter to perform interference mitigation of the interfering signal. In certain embodiments, for example, wireless device 110C may perform one or more of Doppler shift, Doppler spread, average delay, and delay spread estimation for aggressor cell interference handling based on the determined quasi-co-located CSI-RS and/or CRS. In certain embodiments, wireless device 115C may perform de-mapping of neighbor cell interference based on the determined PQI and/or other transmission parameters.

The embodiments are primarily described for interference mitigation of interference received from interfering cells at the wireless device receiver when wireless device 110C receives signals from cell(s) on one carrier, for example, the serving cell or neighboring cells on a primary carrier or a primary serving carrier. However the embodiments are applicable for interference mitigation of interfering signals received by wireless device 110C on cells of a secondary carrier frequency or on cells of a plurality of secondary carrier frequencies or on cells of any number or combination of primary and/or secondary carrier frequencies.

As described above, embodiments of a network and methods described herein include one or more wireless devices 110A-C and one or more network nodes 115A-C of different or similar types. The network may also include any additional elements suitable to support communication between wireless devices or between a wireless device 110A-C and another communication device (such as a landline telephone). A wireless device may include any suitable combination of hardware and/or software. For example, in particular embodiments, a wireless device 110A-C may include some or all of the components described with respect to FIG. 4 below. Similarly, a network node 115A-C may include any suitable combination of hardware and/or software. For example, in particular embodiments, an access node may include the components described with respect to FIG. 5 below.

Figure 4:
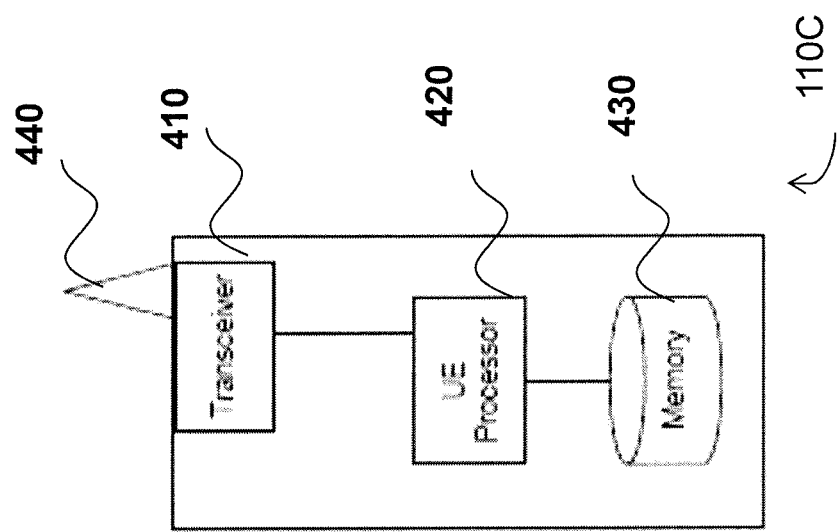
FIG. 4 is a block diagram illustrating an exemplary wireless device, according to certain embodiments.

FIG. 4 is a block diagram illustrating an exemplary embodiment of a wireless device 110A, according to certain embodiments. Examples of wireless device 110A include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, other wireless device capable of D2D operation, or other device that can provide wireless communication. A wireless device 110A may also be referred to as user equipment (UE), a station (STA), or a terminal in some embodiments. Wireless device 110A includes transceiver 410, processor 420, and memory 430. In some embodiments, transceiver 410 facilitates transmitting wireless signals to and receiving wireless signals from an access node (e.g., via an antenna 440), processor 420 executes instructions to provide some or all of the functionality described above as being provided by wireless devices, and memory 430 stores the instructions executed by processor 420.

Processor 420 may include any suitable combination of hardware and software implemented in one or more modules to execute instructions and manipulate data to perform some or all of the described functions of wireless device 110A. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110A may include additional components beyond those shown in FIG. 4 that may be responsible for providing certain aspects of the wireless device's functionality, including any of the functionality described above and/or any additional functionality (including any functionality necessary to support the solution described above).

FIG. 5 is a block diagram illustrating an exemplary network node 115A, according to certain embodiments. Examples of network node 115A include an eNodeB, a node B, a base station, a wireless access point (e.g., a Wi-Fi access point), a low power node, a base station controller, a radio network controller, a relay, a donor node controlling relay, a BTS, transmission points, transmission nodes, RRU, RRH, nodes in a DAS, a core network node, an MME, etc. Network node 115A may include one or more of transceiver 510, processor 520, memory 530, and network interface 540. In some embodiments, transceiver 510 facilitates transmitting wireless signals to and receiving wireless signals from a wireless device (e.g., via an antenna), processor 520 executes instructions to provide some or all of the functionality described above as being provided by an access node, memory 530 stores the instructions executed by processor 520, and network interface 540 communicates signals to backend network components, such as a gateway, switch, router, Internet, Public Switched Telephone Network (PSTN), etc.

Processor 520 may include any suitable combination of hardware and software implemented in one or more modules to execute instructions and manipulate data to perform some or all of the described functions of network node 115A. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 115A, send output from network node 115A, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 115A may include additional components beyond those shown in FIG. 5 that may be responsible for providing certain aspects of the access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Some embodiments of the disclosure may provide one or more technical advantages. As an example, in some embodiments, power consumption and processor complexity associated with mitigating interference at a wireless device may be reduced by signaling the quasi-co-located information of an aggressor cell DMRS and CSI-RS or a CRS from the network node to the wireless device. For example, in a CoMP scenario, a first network node may transmit the PDSCH to a wireless device and a second network node may transmit the CSI-RS to the wireless device. In this case, the PDSCH and its corresponding DMRS may experience different Doppler effects, gain, or delay from the CSI-RS. Where the CSI-RS is not quasi-co-located with the PDSCH, channel estimations based on the CSI-RS may cause performance degradation. Therefore, signaling to the wireless device which CSI-RS ports it can consider as quasi-co-located to the DMRS ports of the aggressor cell will assist the wireless device to calculate reliable channel estimations and improve interference mitigation performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the invention is equally applicable in the uplink.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

What is claimed:

1. A method performed by a network node for providing interference mitigation assistance to a wireless device, comprising:
associating demodulation reference signal (DMRS) sequence information with at least one transmission parameter that applies to the DMRS sequence information; and
transmitting an indication of the association of the DMRS sequence information with the at least one transmission parameter to the wireless device for use in performing mitigation of an interfering signal from a first transmission point.

2. The method of claim 1, wherein the indication of the association of the DMRS sequence information with the at least one transmission parameter identifies a plurality of ports quasi-co-located to each other.

3. The method of claim 1, wherein the at least one transmission parameter comprises channel state information (CSI) comprising one or more of:
a CSI-RS scrambling identity;
a CSI-RS resource configuration identity;
a CSI-RS resource configuration;
a CSI-RS antenna ports count;
a CSI-RS subframe configuration; and
a CSI-RS scrambling identity.

4. The method of claim 1, wherein the at least one transmission parameter further comprises physical downlink shared channel (PDSCH) mapping and quasi-co-location information (PQI) comprising one or more of:
a PDSCH start symbol;
a zero-power CSI-RS configuration; and
a non-zero power CSI-RS configuration.

5. The method of claim 1, wherein the at least one transmission parameter comprises modulation order information.

6. The method of claim 1, wherein the at least one transmission parameter comprises coding rate information.

7. The method of claim 1, further comprising:
associating the DMRS sequence information with at least one additional transmission parameter;
transmitting to the wireless device an indication of the association of the DMRS sequence with the at least one additional transmission parameter.

8. A method performed by a wireless device for performing interference mitigation, comprising:
receiving, from a network node, an indication of an association of demodulation reference signal (DMRS) sequence information with at least one transmission parameter that applies to the DMRS sequence information;
identifying an interfering signal transmitted from a first transmission point;
detecting one or more DMRS parameters of the interfering signal;
based on the indication of the association of the DMRS sequence information to the at least one transmission parameter, identifying that the at least one transmission parameter is associated with the detected one or more DMRS parameters of the interfering signal; and
using the at least one transmission parameter to perform interference mitigation of the interfering signal.

9. The method of claim 8, wherein the indication of the association of the DMRS sequence with the at least one transmission parameter identifies a plurality of ports quasi-co-located to each other.

10. The method of claim 8, wherein the at least one transmission parameter further comprises channel state information (CSI) comprising one or more of:
a CSI-RS scrambling identity;
a CSI-RS resource configuration identity;
a CSI-RS resource configuration;
a CSI-RS antenna ports count;
a CSI-RS subframe configuration; and
a CSI-RS scrambling identity.

11. The method of claim 8, wherein the at least one transmission parameter further comprises physical downlink shared channel (PDSCH) mapping and quasi-co-location information (PQI) comprising one or more of:
a PDSCH start symbol;
a zero-power CSI-RS configuration; and
a non-zero power CSI-RS configuration.

12. The method of claim 8, wherein the at least one transmission parameter comprises modulation order information.

13. The method of claim 8, wherein the at least one transmission parameter comprises coding rate information.

14. A network node for providing interference mitigation assistance to a wireless device, comprising:
memory containing executable instructions; and
one or more processors in communication with the memory, the one or more processors operable to execute the instructions to cause the first network node to:
associate demodulation reference signal (DMRS) sequence information with at least one transmission parameter that applies to the DMRS sequence information; and
transmit an indication of the association of the DMRS sequence information with the at least one transmission parameter to the wireless device for use in performing mitigation of an interfering signal from a first transmission point.

15. The network node of claim 14, wherein the indication of the association of the DMRS sequence information with the at least one transmission parameter identifies a plurality of ports quasi-co-located to each other.

16. The network node of claim 14, wherein the at least one transmission parameter comprises channel state information (CSI) comprising one or more of:
a CSI-RS scrambling identity;
a CSI-RS resource configuration identity;
a CSI-RS resource configuration;
a CSI-RS antenna ports count;
a CSI-RS subframe configuration; and
a CSI-RS scrambling identity.

17. The network node of claim 14, wherein the at least one transmission parameter further comprises physical downlink shared channel (PDSCH) mapping and quasi-co-location information (PQI) comprising one or more of:
a PDSCH start symbol;
a zero-power CSI-RS configuration; and
a non-zero power CSI-RS configuration.

18. The network node of claim 14, wherein the at least one transmission parameter comprises modulation order information.

19. The network node of claim 14, wherein the at least one transmission parameter comprises coding rate information.

20. The network node of claim 14, further comprising:
associating the DMRS sequence information with at least one additional transmission parameter;
transmitting to the wireless device an indication of the association of the DMRS sequence with the at least one additional transmission parameter.

21. A wireless device for performing interference mitigation, comprising:
memory containing executable instructions; and
one or more processors in communication with the memory, the one or more processors operable to execute the instructions to cause the wireless device to:
receive, from the network node, an indication of an association of demodulation reference signal (DMRS) sequence information with at least one transmission parameter that applies to the DMRS sequence information;
identify an interfering signal transmitted from a first transmission point;
detect one or more DMRS parameters of the interfering signal;
based on the indication of the association of the DMRS sequence information to the at least one transmission parameter, identifying that the at least one transmission parameter is associated with the detected one or more DMRS parameters of the interfering signal; and
use the at least one transmission parameter to perform interference mitigation of the interfering signal.

22. The wireless device of claim 21, wherein the indication of the association of the DMRS sequence with the at least one transmission parameter identifies a plurality of ports quasi-co-located to each other.

23. The wireless device of claim 21, wherein the at least one transmission parameter further comprises channel state information (CSI) comprising one or more of:
a CSI-RS scrambling identity;
a CSI-RS resource configuration identity;
a CSI-RS resource configuration;
a CSI-RS antenna ports count;
a CSI-RS subframe configuration; and
a CSI-RS scrambling identity.

24. The wireless device of claim 21, wherein the at least one transmission parameter further comprises physical downlink share channel (PDSCH) mapping and quasi-co-location information (PQI) comprising one or more of:
a PDSCH start symbol;
a zero-power CSI-RS configuration; and
a non-zero power CSI-RS configuration.

25. The wireless device of claim 21, wherein the at least one transmission parameter comprises modulation order information.

26. The wireless device of claim 21, wherein the at least one transmission parameter comprises coding rate information.

* * * * *